June 15, 1965  J. L. MOSSEY  3,189,132
AUTOMATIC ADJUSTER
Original Filed Jan. 2, 1962  2 Sheets-Sheet 1

INVENTOR.
JOSEPH L. MOSSEY
BY
Sheldon Raize
ATTORNEY

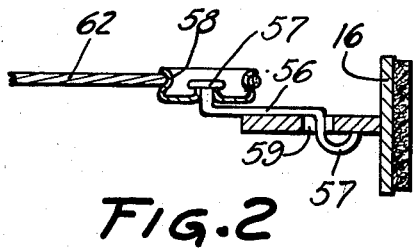
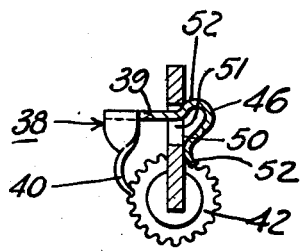
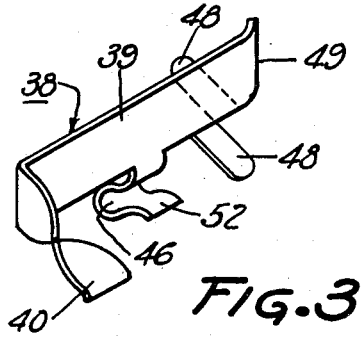

United States Patent Office 3,189,132
Patented June 15, 1965

3,189,132
AUTOMATIC ADJUSTER
Joseph L. Mossey, South Bend, Ind., assignor to The Bendix Corporation, South Bend, Ind., a corporation of Delaware
Continuation of abandoned application Ser. No. 163,682, Jan. 2, 1962. This application Aug. 23, 1963, Ser. No. 304,167
4 Claims. (Cl. 188—79.5)

This application is a continuation-in-whole of my copending application U.S. Serial Number 163,682, filed on January 2, 1962, now abandoned.

This invention concerns an automatic adjuster for brakes.

An object of this invention is to provide a new, improved and economical automatic adjuster for brakes.

Another object of the invention is to provide a brake assembly with an automatic adjuster wherein a spring-like lever engages a serrated wheel of an adjusting strut, to rotate said serrated wheel thereby adjusting the brake.

A further object of the invention is to provide a brake assembly with an automatic adjuster wherein energy for producing a rotational force on a serrated wheel of an adjusting strut through a lever tip portion is accumulated by spring means mounted on the same brake shoe end on which the lever is supported.

A still further object of the invention is to provide a brake assembly with an automatic adjuster comprising a resilient lever mounted on one end of a brake shoe and having a portion engaging the serrated wheel of an adjusting strut wherein the lever applies a rotational force to the serrated wheel from energy stored in said lever.

Further objects and advantages will become apparent to those skilled in the art to which the invention relates from the following description of the preferred embodiment with reference to the accompanying drawings forming part of this specification and in which:

FIGURE 2 is a view of the pulley and its connection to the brake shoe taken along section line 2—2 of FIGURE 1;

FIGURE 3 is a view of the integral spring lever of the invention; and

FIGURE 4 is a view taken along section line 4—4 of FIGURE 1.

Figure 1:
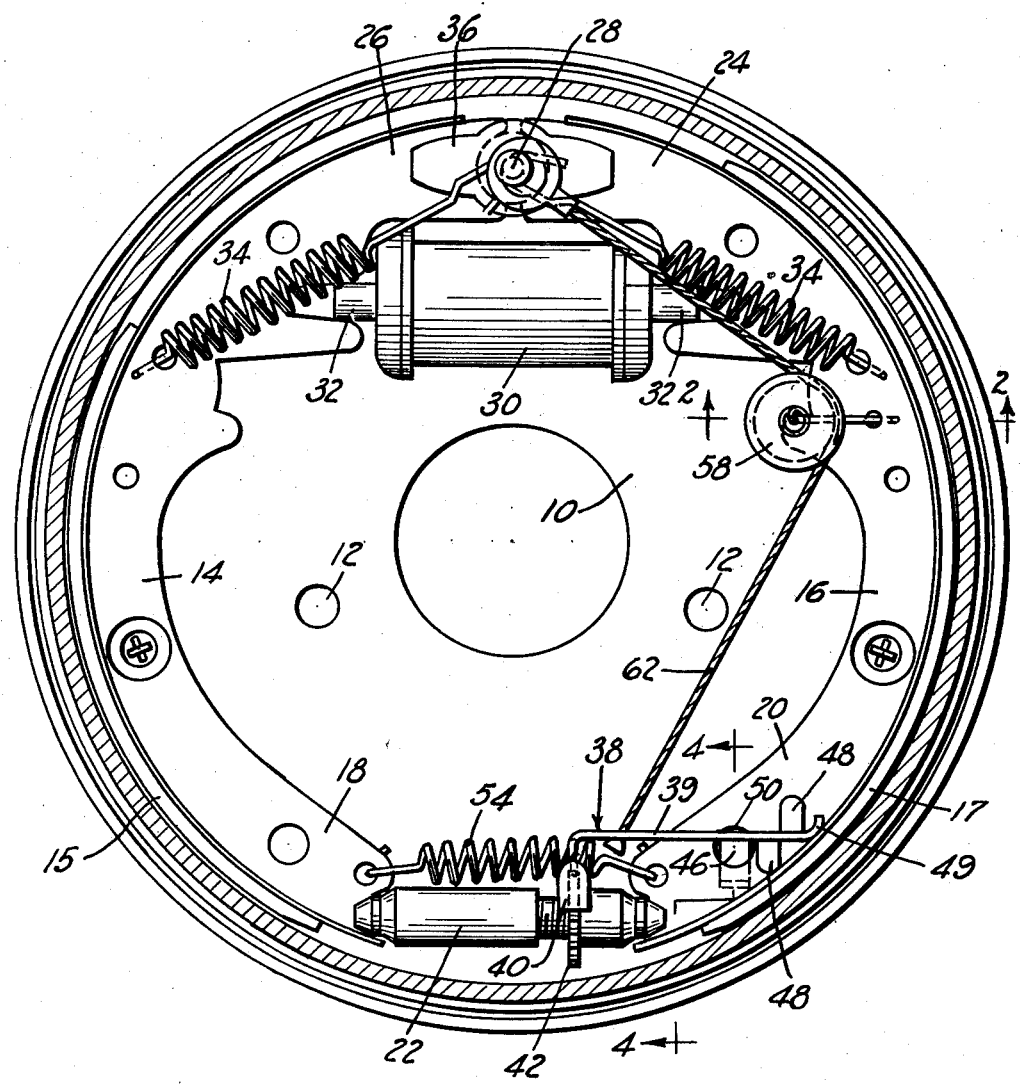
FIGURE 1 is a front elevation view of the brake assembly.

With reference to FIGURE 1, the brake comprises a backing plate 10, having holes 12 receiving bolts to mount the backing plate on an appropriate part of a vehicle such as, for example, an axle flange, not shown. Brake shoes 14, 16 are slidably mounted on the backing plate 10 and have their ends 18, 20 interconnected by adjusting strut 22. The opposite ends 24, 26 of the brake shoes engage anchor pin 28, which is mounted on the backing plate 10 when the brake shoes are in a retracted position. The fluid motor 30 has links 32 engaging the ends 24, 26 of the brake shoes and spreads the ends 24, 26 apart upon actuation of the fluid motor 30. Springs 34 have one end connected to the anchor pin 28 and the other end connected to its respective brake shoe and serve to return the brake shoes to retracted position and thereby bring the shoe ends 24, 26 into engagement with anchor pin 28. The shoe guide plate 36 is mounted on the anchor pin 28 and serves to prevent excess movement of the shoe ends 24, 26 away from the backing plate 10.

An integral spring type lever 38 has a tipped portion 40 at one end which is twisted away from the main body 39 in a direction away from the center of the backing plate and away from the backing plate and has a projecting U-shaped spring finger clip 46 and laterally projecting ears 48 at the other end. The finger clip projection 46 is inserted in opening 50 of the web of the brake shoe 16 and has portions 52 engaging the shoe web. There is a very slight clearance between the edges of the clip 46 and the edge 51 of the opening 50 effecting a connection which allows very slight movement of the spring finger 46 in opening 50. The integral ears 48 engage the web of shoe 16 and end 49 engages the rim of the brake shoe 16 to stabilize the lever on the shoe web. The tipped portion 40 of the lever 38 engages serrated wheel 42 of the adjusting strut 22. The lever 38 does not engage the spring 54 which holds the two ends 18, 20 of the brake shoe in engagement with the adjusting strut 22. An arm 56 is mounted on the web of the brake shoe 16 by any suitable means for instance, the hooked end 57 extending through opening 59 of the brake shoe 16. The hooked end 57 coacts with the web of the brake shoe in the same well known manner that the end of springs 34 coact with the web of their respective brake shoes. A pulley 58 is rotatably secured to the arm 56 by knob 57 thereby effecting a pulley which is rotatably mounted to the web of the brake shoe 16. A cable 62 engages the pulley 58 intermediate its ends and is attached at one end to the lever 38 and at the other end to the anchor pin 28. The adoption of a pulley permits the use of one cable and provides for essentially friction free relative movement between the cable and the web of brake shoe 16.

The brake, as illustrated is adapted to be automatically adjusted upon rearward movement and braking of the vehicle. Assuming that the brake drum 13 rotates in a clockwise direction during rearward movement, upon energization of the fluid motor 30, brake shoes 14, 16 will tend to spread at their upper ends until friction linings 15 and 17 engage the surface of the brake drum. Brake shoe 16 is the primary shoe and will move in a clockwise direction until the secondary shoe 14 anchors against anchor pin 28. Simultaneously, the cable 62 will be tensioned thereby pivoting lever 38 about its end 49 until the clip 46 engages the edge 51 of the opening 50, at which time the lever 38 then pivots about clip 46, with further movement thereof tensioning body portion 39 thereby storing energy in the lever. Depending upon the distance of travel required for the friction lining to engage the brake drum 13, the tipped portion 40 of the lever 38 will either remain in engagement with the same serrated tooth, if the travel distance of the lining is less than a predetermined amount, or drop to the next tooth if the distance of travel is more than a predetermined amount. Upon return movement of the brake shoes 14, 16 to unactuated position the tension on cable 62 is released and the stored energy returns lever 38 to unactuated position thereby rotating the serrated wheel 42 if the tipped portion 40 has picked up another tooth of the wheel 42, or, if it has not picked up another tooth it merely returns the lever 38 to unactuated position without rotating the serrated wheel 42. The design of the spring lever 38 is such that a rotational force will be produced on the serrated wheel upon return movement of the lever 38 to unactuated position.

While the adjusting mechanism has been shown to be actuated by reverse movement and braking of the vehicle, obviously the adjusting mechanism may be actuated upon forward movement and braking of the vehicle. Furthermore, while the cable 62 and pulley 58 have been illustrated as being attached to the same brake shoe web that the spring lever 38 is attached, they may be attached to the web of the other brake shoe, as for instance to the web of brake shoe 14.

Although this invention has been illustrated in connection with specific embodiments numerous other adaptations of the invention will be apparent to those skilled in the art. I intend to include within the scope of the

I claim:

1. In a brake assembly: brake shoes arranged in end to end relationship; each of said brake shoes comprising an arcuate rim having friction material on the outer face thereof and a web extending transversely from the inner face thereof; an adjustable strut between two opposed ends of said brake shoes and operatively connected to said brake shoes for adjustment thereof; said adjustable strut including an element for changing the length thereof; a resilient one piece member for actuating said element; said resilient member being carried at one end portion by one opposed end of one of said brake shoes and having an element actuating portion normally biased in engagement with said element; said one end portion of said resilient member engaging the inner face of the rim of said one brake shoe and having lateral projections extending therefrom engaging each face of said web of said one brake shoe for stabilizing said one end portion on said one brake shoe; means attached to said resilient member for moving said element actuating portion of said resilient member upon spreading of said shoes thereby accumulating energy in said resilient member for returning said element actuating portion to its normal position upon retraction of said brake shoes, whereby said element actuating portion actuates said element when said brake shoes travel a certain distance upon spreading thereof to change the length of said adjustable strut and thereby adjust the position of said brake shoes.

2. In a brake assembly: brake shoes arranged in end to end relationship; each of said brake shoes comprising an arcuate rim having friction material on the outer face thereof and a web extending transversely from the inner face thereof; an adjustable strut between two opposed ends of said brake shoes and operatively connected to said brake shoes for adjustment thereof; said adjustable strut including an element for changing the length thereof; a resilient one piece member for actuating said element; said resilient member being carried at one end portion by one opposed end of one of said brake shoes and having an element actuating portion normally biased in engagement with said element; an opening in the web of said one end of said one shoe; said one end portion of said resilient member having a portion engaging the inner face of the rim of said one shoe, a portion extending into said opening, and lateral projections thereon engaging the web for stabilizing said one end portion on said shoe; means attached to said resilient member for moving said element actuating portion of said resilient member upon spreading of said shoes thereby accumulating energy in said resilient member for returning said element actuating portion to its normal position upon retraction of said brake shoes, whereby said element actuating portion actuates said element when said brake shoes travel a certain distance upon spreading thereof to change the length of said adjustable strut and thereby adjust the position of said brake shoes.

3. In a brake assembly: brake shoes arranged in end to end relationship; each of said brake shoes comprising an arcuate rim having friction material on the outer face thereof and a web extending transversely from the inner face thereof; an adjustable strut betwen two opposed ends of said brake shoes and operatively connected to said brake shoes for adjustment thereof; said adjustable strut including an element for changing the length thereof; a resilient one piece member for actuating said element; said resilient member being thin in cross section; said resilient member being carried at one end portion by one opposed end of one of said brake shoes and having an element actuating portion normally biased in engagement with said element; said one end portion of said resilient member having means for stabilizing said one end portion on said one shoe; said stabilizing means comprising a portion of one face thereof engaging the inner face of the rim of said one shoe, a cross sectional edge thereof engaging the web of said shoe, and lateral projections extending therefrom engaging each face of the web of said shoe; means attached to said resilient member for moving said element actuating portion of said resilient member upon spreading of said shoes thereby accumulating energy in said resilient member for returning said element actuating portion to its normal position upon retraction of said brake shoes, whereby said element actuating portion actuates said element when said brake shoes travel a certain distance upon spreading thereof to change the length of said adjustable strut thereby adjusting the position of said brake shoes.

4. In a brake assembly: brake shoes arranged in end to end relationship; each of said brake shoes comprising an arcuate rim having friction material on the outer face thereof and a web extending transversally from the inner face thereof; an adjustable strut between two opposed ends of said brake shoes and operatively connected to said brake shoes for adjustment thereof; said adjustable strut including an element for changing the length thereof; a resilient one piece member for actuating said element; said resilient member being thin in cross section; said resilient member being carried at one end portion by one opposed end of one of said brake shoes and having an element actuating portion normally biased in engagement with said element; said one end portion of said resilient member having means for stabilizing said one end portion on said one shoe; said stabilizing means comprising a portion of one face thereof engaging the inner face of the rim of said one shoe, a cross sectional edge thereof engaging the web of said shoes, and lateral projections extending therefrom engaging each face of the web of said shoe; said element actuating portion being bent out of the plane of said one end portion whereby the faces of said one end portion and said element actuating portion are transverse to each other; means attached to said resilient member for moving said element actuating portion of said resilient member upon spreading of said shoes thereby accumulating energy in said resilient member for returning said element actuating portion to its normal position upon retraction of said brake shoes, whereby said element actuating portion actuates said element when said brake shoes travel a certain distance upon spreading thereof to change the length of said adjustable strut thereby adjusting the position of said brake shoes.

References Cited by the Examiner

UNITED STATES PATENTS

| 2,060,429 | 11/36 | Smith | 188—79.5 |
| 2,935,163 | 5/60 | Burnett | 188—79.5 |
| 2,978,072 | 4/61 | Burnett | 188—79.5 |
| 3,103,261 | 9/63 | Borgard | 188—79.5 |
| 3,103,992 | 9/63 | Dombeck | 188—79.5 |

EUGENE G. BOTZ, *Primary Examiner.*

DUANE A. REGER, *Examiner.*